(12) United States Patent
Kim

(10) Patent No.: US 9,664,928 B1
(45) Date of Patent: May 30, 2017

(54) RIMLESS EYEGLASSES HAVING DETACHABLE RIM

(71) Applicant: Jong Kim, Los Angeles, CA (US)

(72) Inventor: Jong Kim, Los Angeles, CA (US)

( * ) Notice: Subject to any disclaimer, the term of this patent is extended or adjusted under 35 U.S.C. 154(b) by 0 days.

(21) Appl. No.: 15/000,003

(22) Filed: Jan. 18, 2016

(51) Int. Cl.
    *G02C 9/00* (2006.01)
    *G02C 11/02* (2006.01)
    *G02C 1/02* (2006.01)
    *G02C 5/00* (2006.01)

(52) U.S. Cl.
    CPC ............... *G02C 11/02* (2013.01); *G02C 1/02* (2013.01); *G02C 5/008* (2013.01); *G02C 2200/16* (2013.01)

(58) Field of Classification Search
    CPC ..................................... G02C 9/04; G02C 9/00
    USPC ....................................... 351/110, 47, 44, 41
    See application file for complete search history.

(56) References Cited

U.S. PATENT DOCUMENTS

| | | | | |
|---|---|---|---|---|
| 6,007,197 A * | 12/1999 | Locatelli | ................. | G02C 9/04 351/47 |
| 6,547,387 B1 * | 4/2003 | Katsantones | ............ | G02C 9/00 351/47 |
| 6,742,888 B1 * | 6/2004 | Kim | ......................... | G02C 1/02 351/47 |
| 2008/0002142 A1 * | 1/2008 | Wang | ....................... | G02C 9/00 351/57 |

* cited by examiner

*Primary Examiner* — Hung Dang
(74) *Attorney, Agent, or Firm* — John K. Park; Park Law Firm

(57) ABSTRACT

A rimless eyeglasses having a rim portion IS PROVIDED. The rimless eyeglasses having rim INCLUDES a first rimless lens, an installing portion, and a first rim portion. The first rimless lens comprises an edge portion, a front surface portion, and a rear surface portion. The installing portion is provided along the edge portion of the first rimless lens. The first rim portion comprises an inner edge portion and configured for being installed on the installing portion of the first rimless lens. The first rim portion is detachably attached to the first rimless lens through the installing portion provided at the edge portion of the first rimless lens.

16 Claims, 3 Drawing Sheets

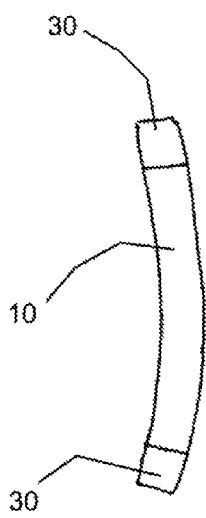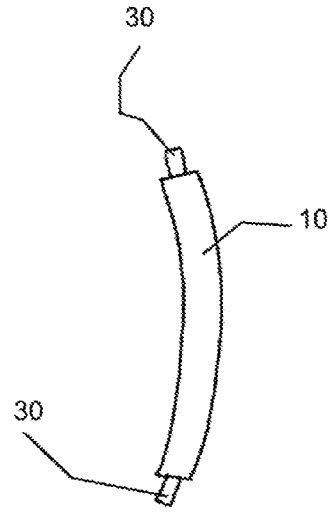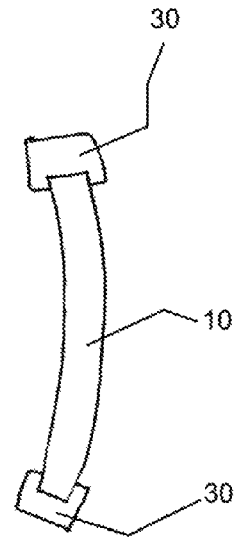
Fig. 3   Fig. 4   Fig. 5
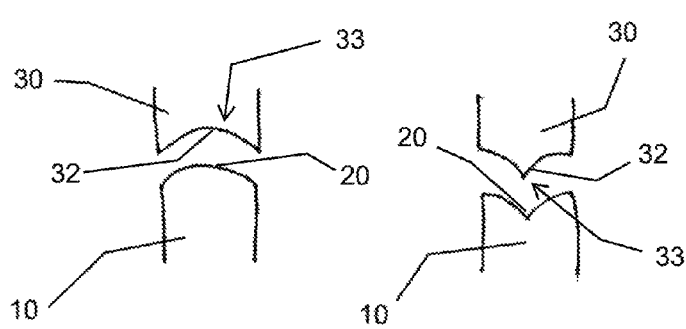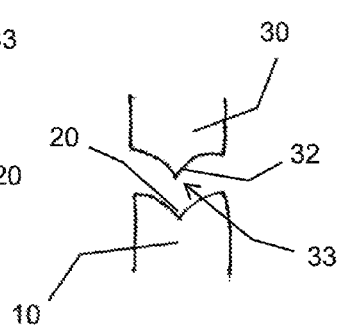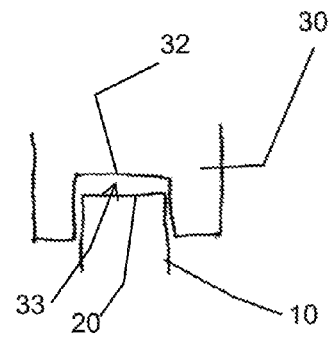
Fig. 6   Fig. 7   Fig. 8

RIMLESS EYEGLASSES HAVING DETACHABLE RIM

BACKGROUND OF THE INVENTION

The present invention relates to a rimless eyeglasses having rim.

In prior arts, rimless glasses have been provided. Sometimes, the final results were not satisfactory, which is recognized as less fashionable to some users.

Therefore, the needs for a rimless eyeglasses having rim for a long time considering the wide and wild usage of eyeglasses.

SUMMARY OF THE INVENTION

The present invention contrives to solve the disadvantages of prior arts.

An object of the invention is to provide a rimless eyeglasses having rim.

Another object of the invention is to provide a rimless eyeglasses having rim, which enables the user to choose what to do with the rims.

Still another object of the invention is to provide a rimless eyeglasses having rim, which increases the satisfaction of the users with a low cost due to a simple structure.

An aspect of the invention provides a rimless eyeglasses having rim. The rimless eyeglasses having rim comprises a first rimless lens, an installing portion, and a first rim portion.

The first rimless lens comprises an edge portion, a front surface portion, and a rear surface portion.

The installing portion is provided along the edge portion of the first rimless lens.

The first rim portion comprises an inner edge portion and configured for being installed on the installing portion of the first rimless lens.

The first rim portion is detachably attached to the first rimless lens through the installing portion provided at the edge portion of the first rimless lens.

A cross-section of the installing portion may be a groove for receiving a corresponding bump provided along the inner edge portion of the first rim portion.

A cross-section of the installing portion may be a bump for receiving a corresponding groove provided along the inner edge portion of the first rim portion.

A cross-section of the inner edge portion of the first rim portion may comprise an enclosing groove for receiving a corresponding the edge portion and the front and rear surface portions neighboring the edge portion of the first rimless lens.

The first rim portion may be flexible.

The first rim portion may be dark in color.

The first rim portion may comprise plastic, rubber, or elastic material.

The pair of rimless eyeglasses may further comprise:

a second rimless lens comprising an edge portion, a front surface portion, and a rear surface portion;

an installing portion provided along the edge portion of the second rimless lens; and a second rim portion comprising an inner edge portion and configured for being installed on the installing portion of the second rimless lens.

The pair of rimless eyeglasses may further comprise a bridge portion configured for connecting and fixing the front surface portions of the first and second rimless lenses.

The pair of rimless eyeglasses may further comprise a pair of temple portions, each of which is attached to the corresponding one of the first and second rimless lenses.

Another aspect of the invention provides a rim for a rimless lens having an edge portion, a front surface portion, and a rear surface portion.

The rim comprises an outer edge portion, an inner edge portion, an engaging portion provided along the inner edge portion, a front surface portion provided between the outer edge portion and the inner edge portion, and a rear surface portion provided between the outer edge portion and the inner edge portion.

The engaging portion is configured for engaging and holding an installing portion of the edge portion of the rimless lens, so as to be attached detachably to the rimless lens.

A cross-section of the engaging portion of the rim may be a bump for receiving a corresponding groove provided along the edge portion of the rimless lens.

A cross-section of the engaging portion of the rim may be a groove for receiving a corresponding bump provided along the edge portion of the rimless lens.

A cross-section of the engaging portion of the rim is a groove for receiving a corresponding bump provided along the edge portion and partial portions of the front and rear surface portions of the rimless lens.

The rim may comprise elastic material. The elastic material may comprise plastic and rubber.

The advantages of the present invention are: (1) the rimless eyeglasses having rim according to the invention is simple in manufacturing and using; and (2) the rimless eyeglasses having rim facilitates the usage of the pair of glasses.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIGS. 3-5 show cross-sectional views of the first rimless lens portion and the first rim portion assembled together along the line A-A according to embodiments of the invention; and FIGS. 6-8 show cross-sectional views of installing portions of the first rimless lens portion and inner edge portions of the first rim portion to be assembled together according to embodiments of the invention.

DETAILED DESCRIPTION OF THE INVENTION

The present invention relates to a rimless eyeglasses having rim, in which rims are provided to be attached to the rimless eyeglasses detachably.

Figure 1:
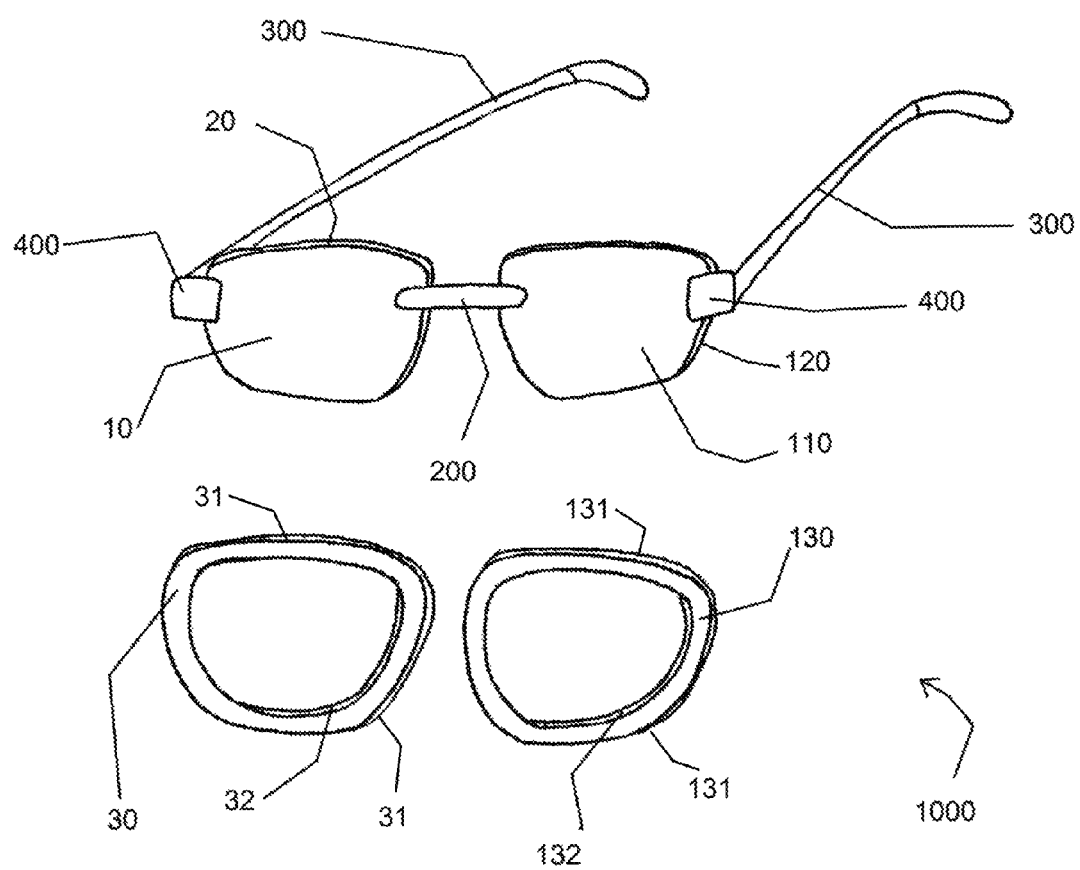
FIG. 1 is a perspective view of a pair of rimless eyeglasses having rim PORTIONS TO BE ATTACHED according to an embodiment of the present invention.
Figure 2:
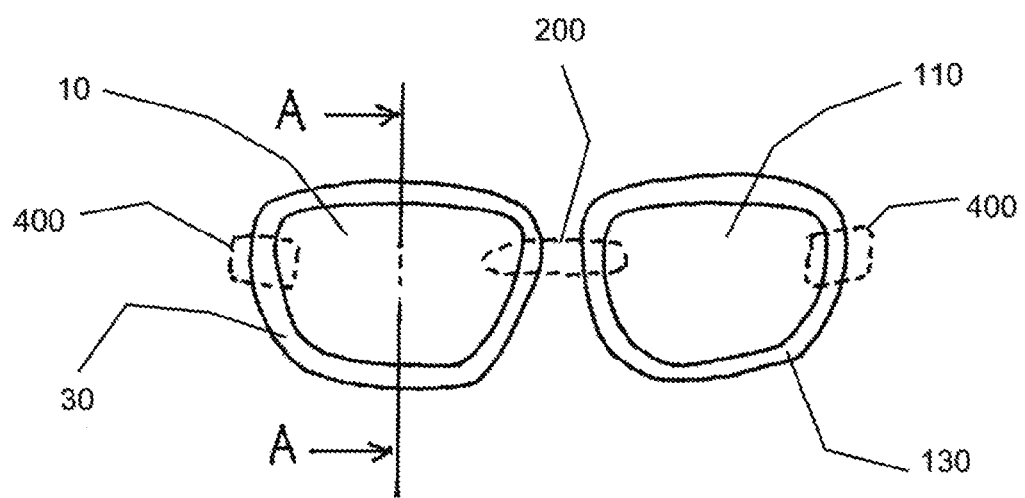
FIG. 2 is a front view of the pair of rimless eyeglasses having rim PORTIONS ATTACHED according to an embodiment of the present invention.

FIGS. 1 and 2 show an embodiment of the present invention, and FIGS. 3-8 show cross-sectional views of installing portions of the first rimless lens portion and inner edge portions of the first rim portion to be assembled together according to embodiments of the invention.

An aspect of the invention provides a rimless eyeglasses 1000. The rimless eyeglasses 1000 having rim comprises a first rimless lens 10, an installing portion 20, and a first rim portion 30 as shown in FIGS. 1 and 2.

The first rimless lens 10 comprises an edge portion, a front surface portion, and a rear surface portion.

The installing portion 20 is provided along the edge portion of the first rimless lens 10.

The first rim portion 30 comprises an inner edge portion 32 and configured for being installed on the installing portion 20 of the first rimless lens 10 as shown in FIGS. 1 and 3-5.

The first rim portion 30 is detachably attached to the first rimless lens 10 through the installing portion 20 provided at the edge portion of the first rimless lens 10 as shown in FIGS. 1 and 3-5.

A cross-section of the installing portion 20 may be a groove for receiving a corresponding bump provided along the inner edge portion 32 of the first rim portion 30 as shown in FIG. 7.

Alternatively as shown in FIG. 6, a cross-section of the installing portion 20 may be a bump for receiving a corresponding groove provided along the inner edge portion 32 of the first rim portion 30.

In certain embodiments of the invention, the cross-section of the inner edge portion 32 of the first rim portion 30 may comprise an enclosing groove for receiving a corresponding edge portion and the front and rear surface portions neighboring the edge portion of the first rimless lens 10 as shown in FIG. 5.

The first rim portion 30 may be flexible.

The first rim portion 30 may be dark in color.

The first rim portion 30 may comprise plastic, rubber, or elastic material.

The pair of rimless eyeglasses 1000 may further comprise:
a second rimless lens 110 comprising an edge portion, a front surface portion, and a rear surface portion;
an installing portion 120 provided along the edge portion of the second rimless lens; and
a second rim portion 130 comprising an inner edge portion and configured for being installed on the installing portion 120 of the second rimless lens 100 as shown in FIG. 1.

The pair of rimless eyeglasses 1000 may further comprise a bridge portion 200 configured for connecting and fixing the front surface portions of the first and second rimless lenses 10, 110 as shown in FIGS. 1 and 2.

The pair of rimless eyeglasses 1000 may further comprise a pair of temple portions 300, each of which is attached to the corresponding one of the first and second rimless lenses 10, 110 through connecting joints 400 as shown in FIG. 1.

Another aspect of the invention provides a rim 30, 130 for a rimless lens 10, 110 having an edge portion, a front surface portion, and a rear surface portion. That is, the rim portions in the previous embodiment can be provided separately as an item.

The rim 30, 130 comprises an outer edge portion 31, 131, an inner edge portion 32, 132, an engaging portion 33, 133 provided along the inner edge portion 32, 132, a front surface portion provided between the outer edge portion and the inner edge portion, and a rear surface portion provided between the outer edge portion and the inner edge portion.

The engaging portion is configured for engaging and holding an installing portion 20, 120 of the edge portion of the rimless lens 10, 110, so as to be attached detachably to the rimless lens 10, 110.

A cross-section of the engaging portion of the rim 30, 130 may be a bump for receiving a corresponding groove provided along the edge portion of the rimless lens 10, 110.

A cross-section of the engaging portion of the rim 30, 130 may be a groove for receiving a corresponding bump provided along the edge portion of the rimless lens 10, 110.

A cross-section of the engaging portion of the rim 30, 130 is a groove for receiving a corresponding bump provided along the edge portion and partial portions of the front and rear surface portions of the rimless lens 10, 110.

The rim 30, 130 may comprise elastic material. The elastic material may comprise plastic and rubber.

Referring to FIG. 1, the rim portions 30, 130 are configured to be attached from behind the rimless lenses 10, 110.

Referring to FIG. 2, The bridge portion 200 and the connecting portions 400 are shown in dash lines for showing the other components clearly.

Referring to FIGS. 3-5, each of the rim portions 30 is installed along the installing portion 20 provided on the outer edge portion of the rimless lens 10. The dimension of the rim portion 30 may be chosen in embodiments.

Referring to FIGS. 6-8, the installing portion 20 and the corresponding inner edge portion 32 may have matchlocking structures. The groove and bump may or may not have cusp as long as the installation is secure.

Referring to FIG. 8, the flanking edges on both sides of the rim portion 30, which encloses the edge portion of the front and rear surface portions, may be elastic and holding so that the rim portion 30 is installed securely on the rimless lens 10.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A pair of eyeglasses comprising:
a first rimless lens comprising an edge portion, a front surface portion, and a rear surface portion;
an installing portion provided along the edge portion of the first rimless lens; and
a first rim portion comprising an inner edge portion and configured for being installed on the installing portion of the first rimless lens, wherein the inner edge portion is provided along on an edge portion of the first rim portion,
wherein the first rim portion is detachably attached to the first rimless lens through the installing portion provided at the edge portion of the first rimless lens with respect to the inner edge portion of the first rim portion.

2. The pair of rimless eyeglasses of claim 1, wherein a cross-section of the installing portion is a groove for receiving a corresponding bump provided along the inner edge portion of the first rim portion.

3. The pair of rimless eyeglasses of claim 1, wherein a cross-section of the installing portion is a bump for receiving a corresponding groove provided along the inner edge portion of the first rim portion.

4. The pair of rimless eyeglasses of claim 1, wherein a cross-section of the inner edge portion of the first rim portion comprises an enclosing groove for receiving a corresponding edge portion and the front and rear surface portions neighboring the edge portion of the first rimless lens.

5. The pair of rimless eyeglasses of claim 1, wherein the first rim portion is flexible.

6. The pair of rimless eyeglasses of claim 5, wherein the first rim portion is dark in color.

7. The pair of rimless eyeglasses of claim 5, wherein the first rim portion comprises plastic, rubber, or elastic material.

8. The pair of rimless eyeglasses of claim 1, further comprising:
- a second rimless lens comprising an edge portion, a front surface portion, and a rear surface portion;
- an installing portion provided along the edge portion of the second rimless lens; and
- a second rim portion comprising an inner edge portion and configured for being installed on the installing portion of the second rimless lens.

9. The pair of rimless eyeglasses of claim 8, further comprising a bridge portion configured for connecting and fixing the front surface portions of the first and second rimless lenses.

10. The pair of rimless eyeglasses of claim 8, further comprising a pair of temple portions, each of which is attached to the corresponding one of the first and second rimless lenses.

11. A rim for rimless lens having an edge portion, a front surface portion, and a rear surface portion, the rim comprising:
- an outer edge portion;
- an inner edge portion provided along on an edge portion of the first rim;
- an engaging portion provided along the inner edge portion;
- a front surface portion provided between the outer edge portion and the inner edge portion; and
- a rear surface portion provided between the outer edge portion and the inner edge portion,
- wherein the engaging portion provided along the inner edge portion is configured for engaging and holding an installing portion provided along the edge portion of the rimless lens, so as to be attached detachably to the rimless lens.

12. The rim of claim 11, wherein a cross-section of the engaging portion of the rim is a bump for receiving a corresponding groove provided along the edge portion of the rimless lens.

13. The rim of claim 11, wherein a cross-section of the engaging portion of the rim is a groove for receiving a corresponding bump provided along the edge portion of the rimless lens.

14. The rim of claim 11, wherein a cross-section of the engaging portion of the rim is a groove for receiving a corresponding bump provided along the edge portion and partial portions of the front and rear surface portions of the rimless lens.

15. The rim of claim 11, wherein the rim comprises elastic material.

16. The rim of claim 15, wherein the elastic material comprises plastic and rubber.

* * * * *